(12) United States Patent
Koslow (10) Patent No.: US 6,840,986 B1
(45) Date of Patent: Jan. 11, 2005

(54) AIR PURIFYING FILTER SYSTEMS FOR BUILDING AIR SUPPLY AND RESPIRATORS USEFUL AGAINST NBC ATTACKS

(75) Inventor: Evan E. Koslow, Weston, CT (US)

(73) Assignee: Koslow Technologies Corporation, Orange, CT (US)

( * ) Notice: Subject to any disclaimer, the term of this patent is extended or adjusted under 35 U.S.C. 154(b) by 0 days.

(21) Appl. No.: 10/371,951

(22) Filed: Feb. 21, 2003

Related U.S. Application Data (60) Provisional application No. 60/359,235, filed on Feb. 22, 2002.

(51) Int. Cl.[7] ............................................. B01D 53/04
(52) U.S. Cl. ........................... 96/135; 96/147; 96/153; 96/154; 55/385.1; 55/514; 55/DIG. 33; 55/DIG. 35
(58) Field of Search .......................... 96/130, 134–142, 96/147.1, 53, 154; 55/385.1, 385.6, 385.7, 514–516, DIG. 33, DIG. 35

(56) References Cited

U.S. PATENT DOCUMENTS

| | | | | |
|---|---|---|---|---|
| 2,787,333 A | * | 4/1957 | Boone et al. ................. | 96/139 |
| 3,925,248 A | * | 12/1975 | Moroni et al. .............. | 502/159 |
| 4,699,681 A | * | 10/1987 | Kasmark et al. ............ | 156/264 |
| 4,867,770 A | * | 9/1989 | Feeney ........................ | 96/137 |
| 4,961,764 A | * | 10/1990 | Develle et al. ............... | 96/139 |
| 5,129,929 A | * | 7/1992 | Linnersten ................. | 96/117.5 |
| 5,338,340 A | * | 8/1994 | Kasmark et al. ............. | 96/135 |
| 5,350,443 A | * | 9/1994 | von Blucher et al. ......... | 96/135 |
| 5,354,365 A | * | 10/1994 | Youn ............................ | 96/135 |
| 5,423,903 A | * | 6/1995 | Schmitz et al. ............... | 96/134 |
| 5,616,169 A | * | 4/1997 | de Ruiter et al. ............... | 95/90 |
| 5,651,810 A | * | 7/1997 | Flaherty et al. ............... | 95/287 |
| 5,662,728 A | * | 9/1997 | Groeger ...................... | 96/153 |
| 5,792,513 A | * | 8/1998 | Koslow et al. ............. | 427/195 |
| 5,807,424 A | * | 9/1998 | de Ruiter et al. ............. | 95/148 |
| 6,077,588 A | * | 6/2000 | Koslow et al. ............. | 428/114 |
| 6,200,368 B1 | * | 3/2001 | Guerin et al. ................. | 96/135 |
| 6,302,946 B1 | * | 10/2001 | Cronia et al. ................. | 96/154 |
| 6,703,072 B2 | * | 3/2004 | Fu et al. ...................... | 427/201 |
| 2001/0029843 A1 | * | 10/2001 | Minoru et al. ................ | 96/135 |
| 2002/0069761 A1 | * | 6/2002 | Fuchs .......................... | 96/135 |
| 2002/0166450 A1 | * | 11/2002 | Kishkovich et al. .......... | 96/134 |

FOREIGN PATENT DOCUMENTS

GB         2238731 A   *   6/1991

* cited by examiner

Primary Examiner—Robert H. Spitzer
(74) Attorney, Agent, or Firm—Shirley S. Ma (57) ABSTRACT

An air filter that can fit within existing building HVAC air supply systems suitable for withstanding NBC attacks, comprising a series of pleated composite layers. By using impregnated carbon particles of the proper size, nerve gases, and gases of lower molecular weight, such as cyanogen chloride, are effectively controlled, even under tests simulating large-scale attacks. A particulate filter such as, for example, a HEPA filter, may be included to control biological particles or toxic aerosol droplets. The complete filter operates at such a low differential pressure, that existing building mechanicals do not have to be upgraded or replaced. Also disclosed is a filter for use with a respirator.

27 Claims, 7 Drawing Sheets

AIR PURIFYING FILTER SYSTEMS FOR BUILDING AIR SUPPLY AND RESPIRATORS USEFUL AGAINST NBC ATTACKS

This application claims priority from U.S. Provisional Patent Application Ser. No. 60/359,235 filed on 22 Feb. 2002.

The present invention relates to air filters and, more particularly, to air filters that may be used in, for example, heating, ventilation and air conditioning applications (HVAC) or in respirators. More particularly, it relates to such filters that are designed to provide defense against threats such as nuclear, biological, and chemical (NBC) attacks.

SUMMARY OF THE INVENTION

The present invention is directed to, in a first aspect, a filter system comprising: one or more pleated layers of a high surface area composite operating in series, each layer having an air permeability greater than about 9 m/min at about 1.27 cm water column, and comprising adsorbent or chemically reactive particles immobilized into a flexible form and containing greater than about 300 g/m² of said particles, and wherein a pressure drop of a plurality of layers is less than about 5 cm water column at a rated flow for a given air purification application.

In another aspect, the present invention is directed to a filter system comprising: a plurality of composite layers operating in series, each of said composite layers comprising: a first air permeable substrate; a second air permeable substrate; and activated carbon particles loaded at a high density at a rate of about 600 to 2000 g/m² between the first air permeable substrate and the second air permeable substrate and further including a binder wherein at least a portion of the binder binds at least a portion of the activated carbon particles to one another and at least a portion of the activated carbon particles to one or both of the first air permeable substrate and the second air permeable substrate, wherein a pressure drop of the plurality of composite layers is less than about 5 cm water column at a rated flow for a given air purification application.

In yet another aspect, the present invention is directed to a filter system comprising: a plurality of flexible composite layers operating in series, each layer comprising: a first air permeable substrate; and activated carbon particles having a particle size of about 20×50 mesh and binder disposed on the first air permeable substrate at a load rate of about 2000 g/m², a portion of the binder binding at least a portion of the activated carbon particles to one another and at least a portion of the activated carbon particles to the first air permeable substrate; wherein the activated carbon particles are closely packed to a high density and compacted to a critical range of compaction wherein axial dispersion is reduced and permeability is high; and a frame for encapsulating a periphery of each layer of said plurality of pleated composite layers, said frame being generally oval in shape and having a first radius of curvature in a first direction, and a second radius of curvature in a second direction.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

In describing the preferred embodiment of the present invention, reference will be made herein to FIGS. 1 to 6 of the drawings in which like numerals refer to like features of the invention. Features of the invention are not necessarily shown to scale in the drawings.

Figure 1:
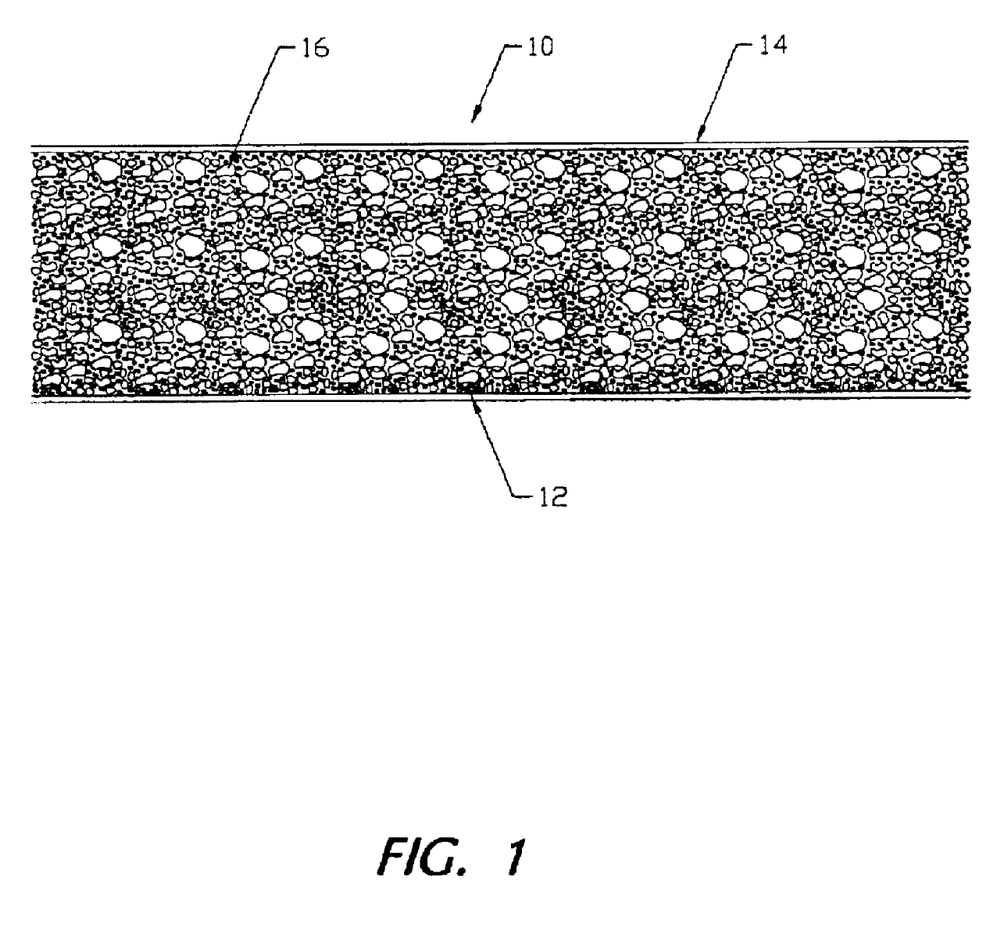
FIG. 1 is a cross-sectional view of a filter medium in accordance with the invention.

In FIG. 1, a filter medium 10 includes a first substrate 12 and a second substrate 14. These substrates have, disposed between them, a composite layer 16 including activated carbon particles and a suitable binder material for binding at least a portion of the carbon particles to each other, and at least a portion of the carbon particles to one of the substrates 12 and 14. Substrates 12 and 14 can be nonwoven materials, such as, for example, a spun-bonded polyester, such as REEMAY™ 2004 having a weight of 0.4 ounces per square yard or REEMAY™ 2275 having a weight of 0.75 ounces per square yard, respectively, available from BBA Nonwovens, Inc., of Old Hickory, Tenn.

The binder used to hold the composite together can be low density polyethylene (LDPE) binder particles, such as Grade FN510, manufactured by Equistar Chemicals, LP of Tuscola, Ill., and sold under the trademark MICROTHENE®. These LDPE particles are primarily in the range of 10 to 30 microns in diameter, with some portion of the size distribution being outside this range. This material can be combined with additives such as activated alumina, zeolites, diatomaceous earth, silicates, silicas, aluminosilicates, titanates, bone char, calcium hydroxyapatite, manganese oxides, iron oxides, magnesia, perlite, talc, polymeric particulates, clay, iodated resins, ion exchange resins, ceramics, and combinations thereof. Preferably, synthetic amorphous precipitated silicon dioxide is added to the activated carbon and binder in an amount of about 0.5% by weight of the binder. A synthetic amorphous silicon dioxide hydrate sold under the tradename SIPERNAT® 22LS, available from Degussa Corporation Pigment Group of Ridgefield Park, N.J., is especially preferred. The amorphous silicon dioxide additive works as a dry dispersant to break the polymeric binder into individual particles.

The activated carbon is preferably an impregnated variety, such as ASZM-TEDA carbon available from Calgon Carbon, of Pittsburg, Pa., which is generally produced as particles of 12×30 mesh in size. This carbon is a military grade of carbon that can remove chemical threats, such as nerve gas, and is treated to also remove cyanogen chloride (CK). It also efficiently adsorbs DMMP (dimethyl methylphosphonate), which is used as a "simulant" that closely mimics the adsorptive properties of actual nerve agents, and is the standard low-toxicity test reagent used in military programs to test filters.

In accordance with the present invention, the ASZM-TEDA carbon can at least partially be further reduced in size to 20×50 mesh. The carbon is incorporated into the filter medium at a very high load rate of about 300 to about 750 g/m$^2$ for air filters, and may be greater than about 2000 g/m$^2$ for respirators. However, the air permeability or the "Frazier", determined in accordance with the Frazier test method, of this material, at carbon loading of just over 600 g/m$^2$ is 190 ft/min (57.9 m/min) at a pressure differential of 0.5 inch (1.27 cm) water column. Hence, even though the filter medium contains a high density packed layer of considerable carbon weight, this material has excellent permeability. It has a thickness of approximately 1.4 mm and is exceptionally easy to pleat, without cracking or releasing carbon particles. Thus, even though the basis weight of the filter media is quite high, the filter media of the present invention is still easily pleatable. In filter systems that require an exceptionally high basis weight filter media with space limitations, the filter media of the present invention may be layered, stacked or spiral wound.

Filter medium 10 is formed by the process described in detail in U.S. Pat. Nos. 5,792,513 and 6,077,588, which are incorporated by reference in their entirety, as if fully set forth herein. Materials of this general nature are sold under the trademark PLEKX®, by KX Industries, L.P., of Orange, Conn. Although shown in this embodiment as a medium with two substrates, it will be understood that the medium may be formed with a composite layer of an adsorbent and binder upon a single substrate, in accordance with the process of the abovementioned patents. In addition, multiple layer versions are possible, with alternating layers of air permeable substrates and adsorptive layers.

EXAMPLE 1

A Building HVAC Filter System

Figure 2:
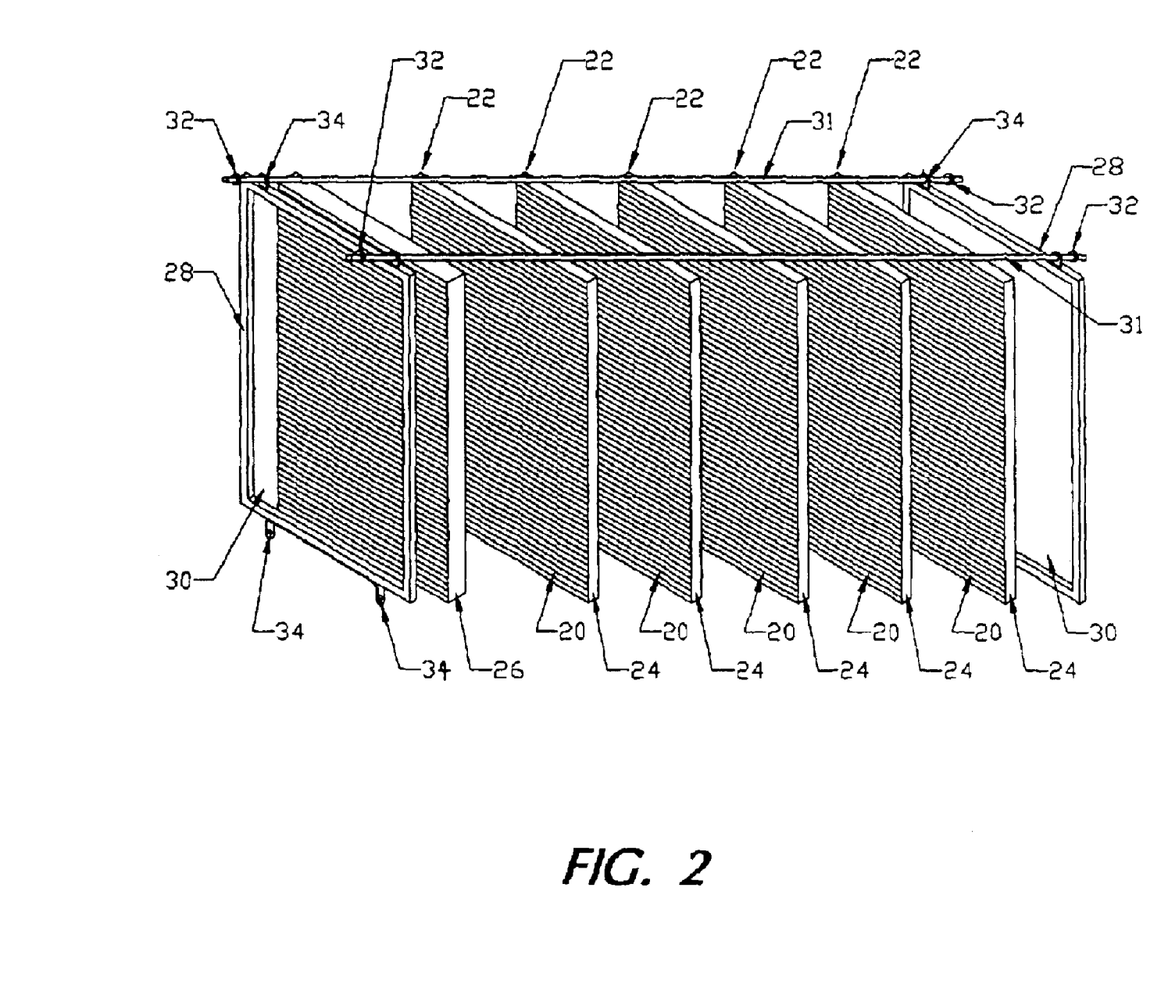
FIG. 2 is an exploded perspective view of a filter in accordance with the invention.

Referring to FIG. 2, an exploded cross-sectional view of a filter system in accordance with the invention is illustrated. The filter medium 20 of the type illustrated in FIG. 1 may be pleated with, for example, a blade or rotary-score pleating machine, all well known in the art. After pleating, the spacing of the pleats is fixed using hot melt beads applied to the crowns of the correctly spaced pleats or by other techniques well known in the art. Thereafter, a filter element panel 22 is formed when pleated medium 20 is potted within a frame 24. Potting can be accomplished by affixing a non-woven tape to the periphery of the pleated structure using a hot melt adhesive, or by application of other glues and adhesives to form a seal to a surrounding frame. Filter element panels 22 can be handled easily and combined with other filter element panels 22, by stacking. As illustrated in FIG. 2, a series of five 24 inches×24 inches (60 cm×60 cm) filter element panels 22, each having the structure described above, can be assembled together to form a carbon pack assembly.

Figure 3:
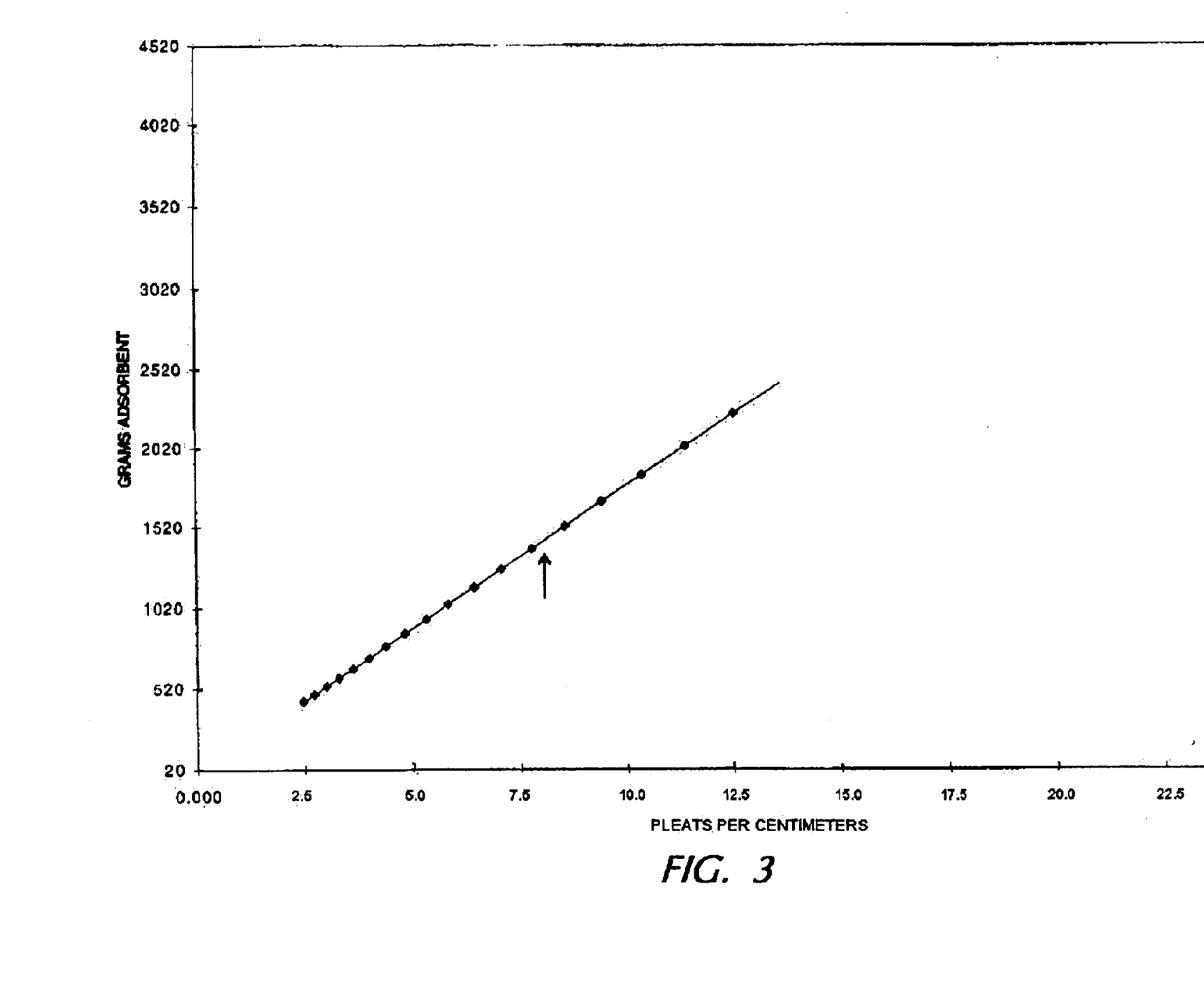
FIG. 3 is a graph of the total adsorbent mass as a function of pleat pitch, for a filter in accordance with the invention.

The filter medium may be pleated tightly, with each pleat having a pitch of about one third of an inch (slightly over-packed). At this pleat pitch, each panel contains 1400 g of activated carbon (as shown in FIG. 3). Thus, the five filter element panels contain a total of about 7 kg of activated carbon. Each of these filter element panels has a pressure drop of 0.05 inch (1.2 mm) water column at a flow rate of 2000 scfm (18 ft/min=5.4 m/min) into the pleated surface, resulting in a total pressure drop of 0.25 inches (0.635 cm) water column across the five panels operating in series.

Each filter element panel 22 has a pleat height of about 4 inches (10.2 cm). Thus, when stacked together the five filter element panels have a combined thickness of 20 inches (51 cm) when assembled. A particulate filter panel 26, used as the initial filter element facing the influent air can also have a thickness of approximately four inches (10.2 cm). Thus, when assembled, the filter system will have a total thickness of 24 inches (61 cm). The overall dimensions will be 24 inches×24 inches×24 inches (61.0 cm×61.0 cm×61.0 cm), allowing the assembly to fit within the space currently provided for filters within existing HVAC systems. Panels 22 and panel 26 may be held together by end frame members 28 having large square opening 30 to allow for the flow of air. End frame members 28 may be biased towards each other, for example, by rods 31 threaded at each end to receive nuts 32, and extending through holes 34 in frames 28. Suitable channels may be provided in the frames 24 and in the frame of panel 26 so that the dimensions of the assembly are not enlarged beyond those that are required to fit into the standard space provided in most buildings.

While, panel 26 may be a HEPA filter, another advantage of the carbon panels in accordance with the invention is that each panel 22 has the effect of reducing particulate and aerosol content of the air passing through it by approximately 50%. Five successive panels 22 therefore reduce such content to approximately 3.2% of the original concentration. Under these circumstances, particulate filter panel 26 does not necessarily need to be a HEPA filter (which removes 99.97% of particles of 0.3 microns in size or larger). Instead, it can be a filter that removes about 99% of such particles. The result will be HEPA-like performance for the complete filter system, with a lower overall pressure drop.

A test of a five-layer carbon pack operating under the air flow conditions outlined above, and in accordance with the invention, using DMMP in a concentration of 500 mg/m$^3$, showed that the filter provides over 70 minutes with no detectable signal, less than 0.04 mg/m$^3$, and no physiologically significant breakthrough of DMMP nerve gas simulant for 150 minutes. This indicates that the filter can handle 4350 grams of incoming nerve gas while protecting the occupants of the building. The occupants would have non-lethal exposure even to an attack of twice that size. To get this much nerve gas into the ventilation system of a building would require an attack with hundreds or thousands of pounds of a nerve gas released, such as the more volatile sarin (GB), at a relatively modest distance from the building. Even with a massive attack of this nature, the nerve gas concentration outside the building would dissipate in the time during which protection is afforded by the filter in accordance with the invention.

A test of a five layer filter pack using CK shows much lower protection, as expected. The integral over ten minutes of the quantity of CK passing through the filter is 3.56% of the influent challenge. An initial attack of 500 mg/m$^3$ over ten (10) minutes wherein the CT value is 5000 mg·min/m$^3$, allows only 178 mg·min/m$^3$ units (concentration×time) of CK to pass through the filter. Since CK is a much less toxic material than nerve gas, with a 50% lethal dose of approximately 11,000 CT units, this is only about 1.5% of the 50% lethal dose. The filter, therefore, provides complete protection of the occupants of the building for a brief attack with a highly volatile gas that would dissipate very rapidly, on the time scale of less than ten minutes.

ASZM-TEDA carbon, ground from 12×30 mesh size to 20×50 mesh exhibits almost no change in performance with respect to a challenge by DMMP as a surrogate for nerve gas. However, the performance against CK improves significantly. In other words, with almost no measurable change in performance against nerve gas, a much better balance in performance against CK is achieved, going from about 50% breakthrough at 10 minutes with conventional 12×30 mesh ASZM-TEDA carbon, to 3.56% breakthrough with 20×50 mesh ASZM-TEDA carbon. A large number of serious sub-lethal casualties would result from an attack with 5000 mg·min/m$^3$ of CK if the activated carbon was not adjusted to a smaller mesh size.

Thus, the present invention provides a low cost, low air flow resistance, easily retrofitted filtration system that provides protection against NBC threats. Buildings such as high-value commercial buildings, hospitals, government office buildings, embassies or military installations, as well as ships and airplanes, can be readily protected with this filtration system by a simple substitution of filters.

In applications where it is not expected that an attack with CK will occur, a non-impregnated carbon such as grade BPL, also available from Calgon Carbon, may be used instead of an impregnated carbon such as ASZM-TEDA.

The present invention, by using a thin, high-density carbon filtration medium, permits the establishment of a very compact mass transfer zone in a thin filter medium, at a very low pressure drop.

Figure 4:
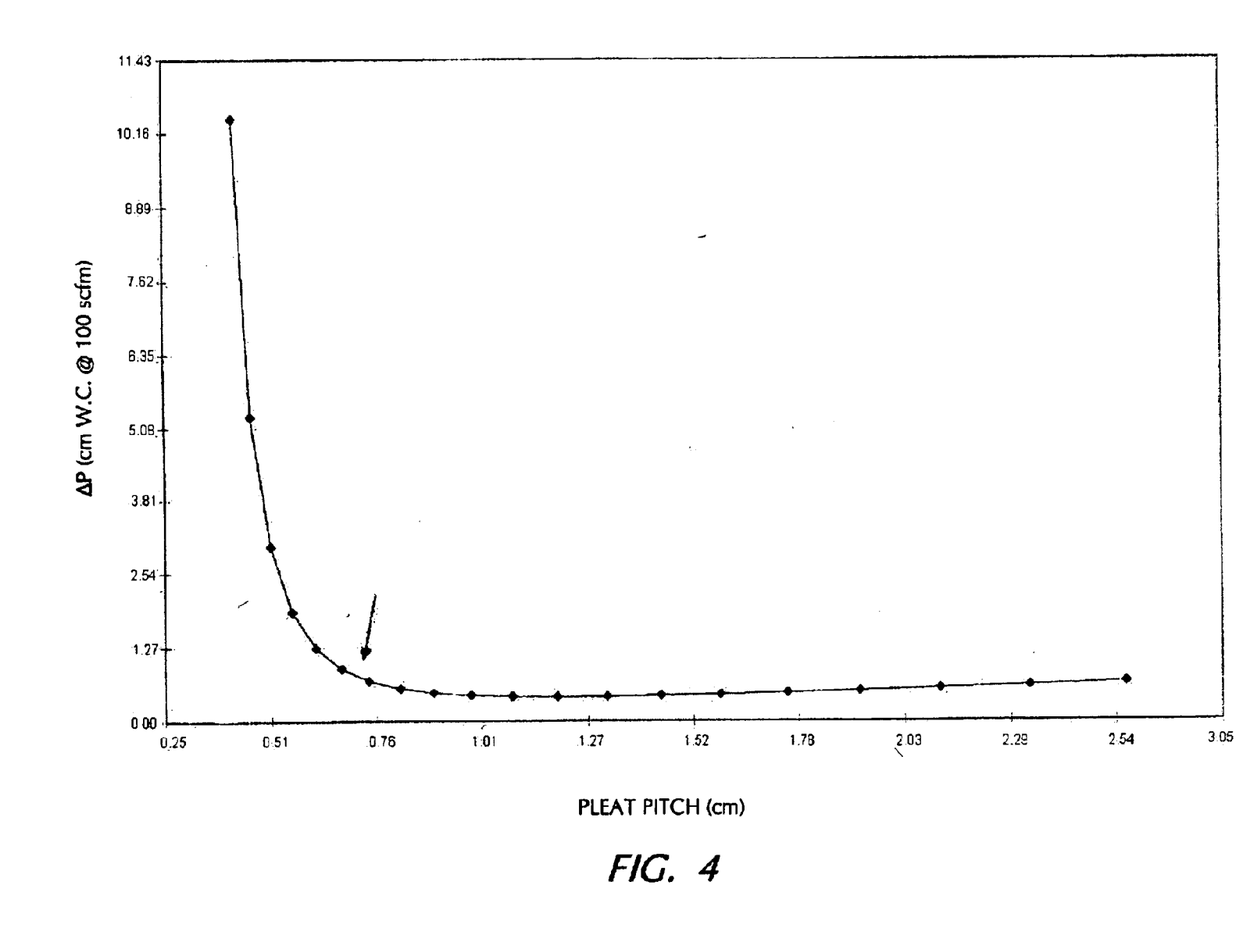
FIG. 4 is a graph of pressure drop at 2000 standard cubic feet per minute verses pleat pitch for a filter in accordance with the invention.

FIG. 3 is a graph of calculated total adsorbent mass as a function of pleat pitch, for a filter in accordance with the invention. FIG. 4 is a graph of calculated pressure drop at 2000 standard cubic feet per minute verses pleat pitch for a filter in accordance with the invention. As shown, a pleat pitch of 3 pleats/inch is just at the knee of the curve. At shorter pitch, differential pressure rises very significantly. A longer pitch results in a lower density of carbon incorporated into the filter, as shown in FIG. 3, and a slowly rising pressure drop as less cross-sectional flow area is provided.

EXAMPLE 2

A Respirator Filter for NBC Attacks

Figure 5:
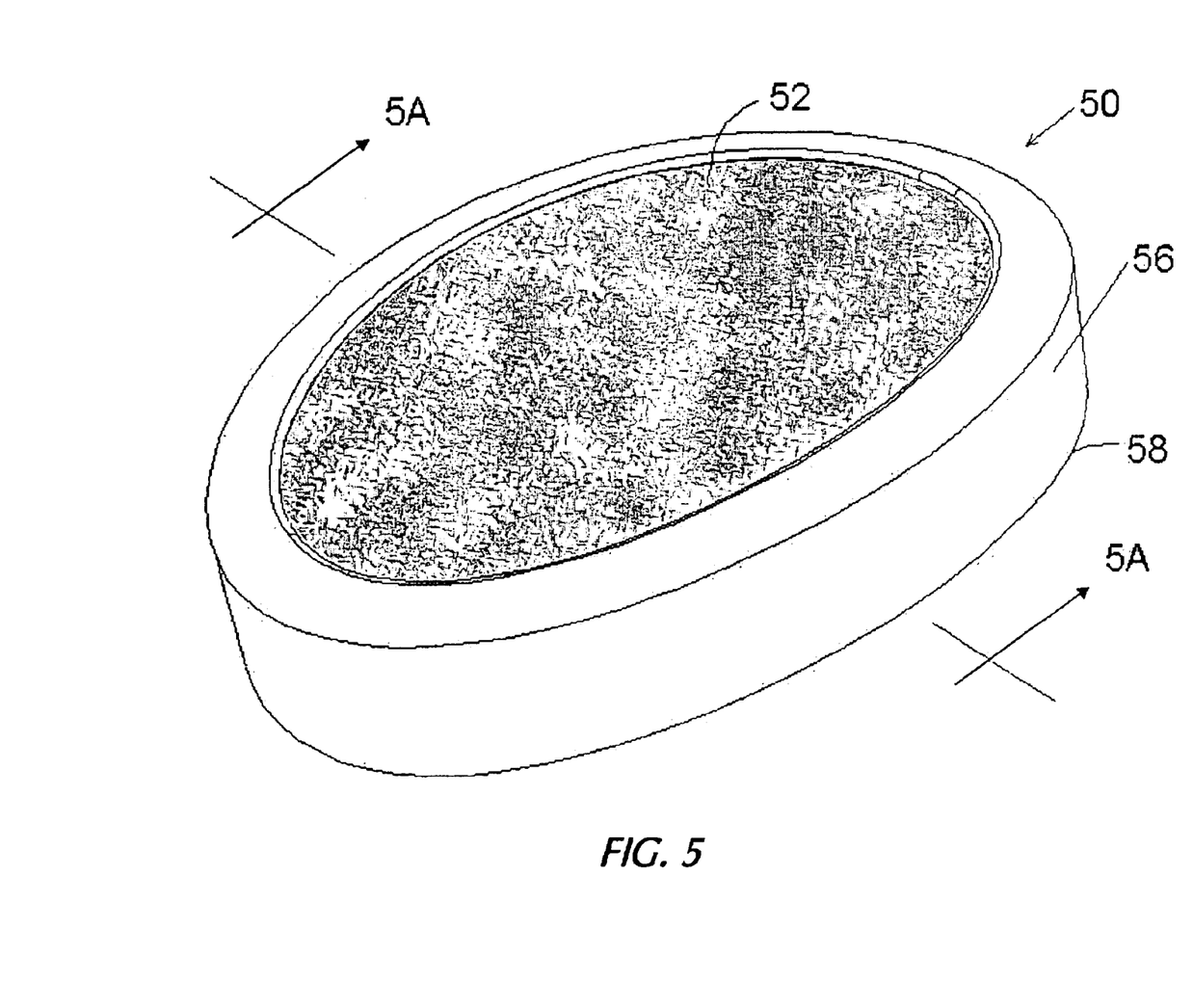
FIG. 5 is a perspective view of a respirator air filter in accordance with the invention.
Figure 5A:
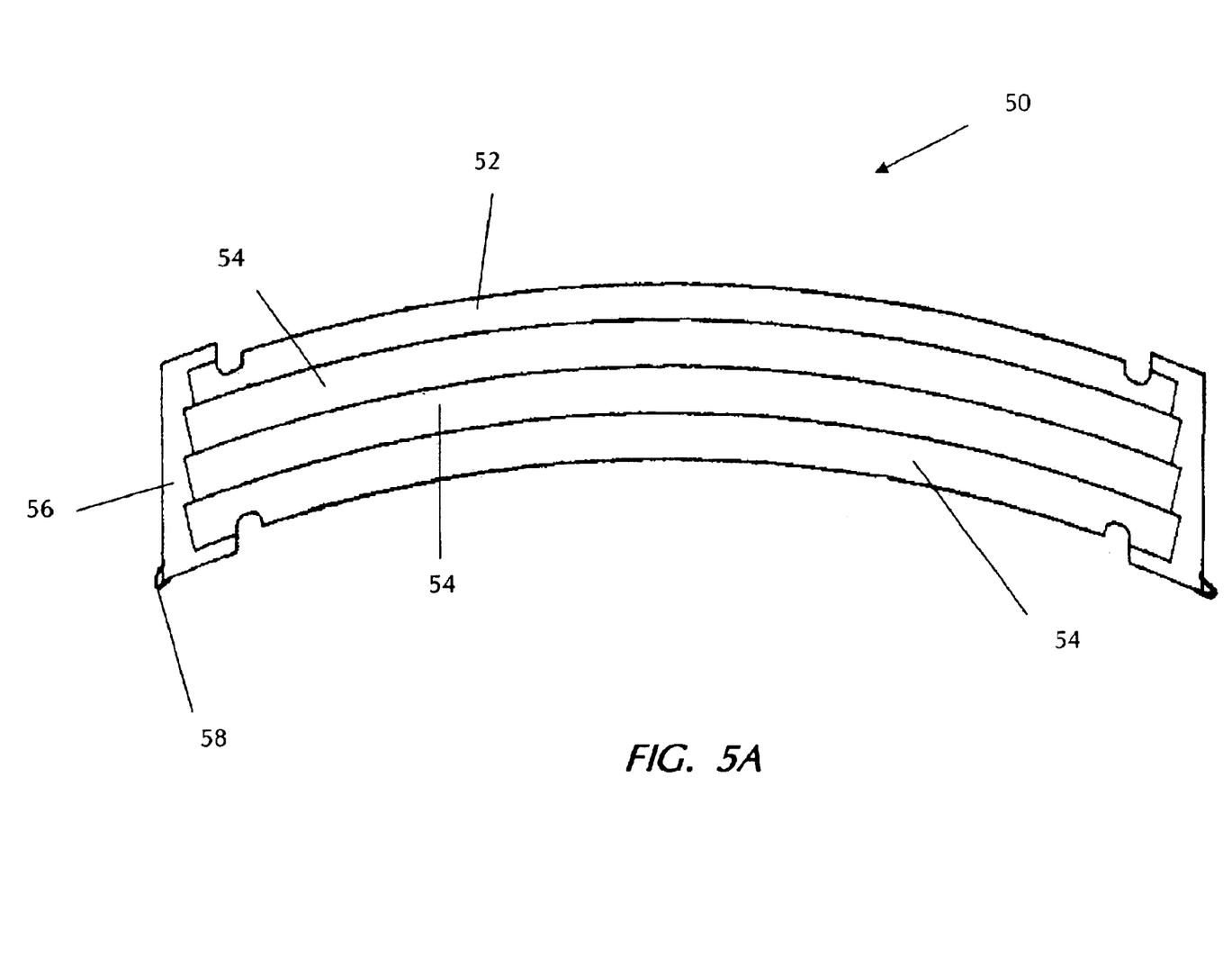
FIG. 5A is an enlarged cross-sectional view, taken along line 5A—5A of the filter of FIG. 5.

Referring to FIG. 5 and to FIG. 5A, a respirator filter 50 in accordance with the invention includes a HEPA layer 52 and a plurality of adsorbent layers 54 (five layers in a preferred embodiment). Each layer 54 may be similar in construction to the adsorbent filter medium described above, but the loading rate of carbon in each layer may be as high as 2,000 g/m$^2$. The thickness of the adsorbent layers and the substrates between which the adsorbent layer is disposed, may be in the order of 1.85 mm to 3.00 mm. The various layers may be encapsulated within an elliptical, injection molded edge seal configuration or frame 56 made from a rubber-like thermoplastic, elastomeric material. This frame 56 may be formed of, for example SANTOPRENE® available from Advanced Elastomer Systems, Akron Ohio. Frame 56 preferably has a hardness of Shore A64 and is preferably curved in two perpendicular directions so as to follow the curved contour of a typical adult, human cheek. A small annular rim or protrusion 58 may be molded into the peripheral frame 56 to act as a seal when filter 50 is inserted into a receiver, such as that in a respirator. This type of filter provides high DMMP and CK adsorption at a very modest pressure differential.

Due to the flexible nature of the filter media, this structure has the advantage of allowing activated carbon to be packed in a very dense manner, and on a curved surface.

One or more of the adsorbent layers 54 may include a specialty adsorbent, such as may be required, for example, to control toxic industrial chemicals (TICs). Under normal circumstance it would be very difficult, if not impossible, to pack a number of such thin layers in a typical respirator canister. Such layer may include, for example, a zeolite, a metal impregnated mineral or other specialized materials such as copper sulphate. By using a multilayered structure, a large variety of properties may be provided in a single canister. For example, it is possible to filter out chemical warfare agents and a broad spectrum of TICs that may be encountered in occupational or industrial applications.

It is possible for the pressure differential of this filter to be extremely low. Air permeability values of up to about 185 ft/min (56.4 m/min) are possible, with a differential pressure of less than or equal to about 0.5 inches (1.27 cm) of water column.

EXAMPLE 3

Collective Protection Applications

Figure 6:
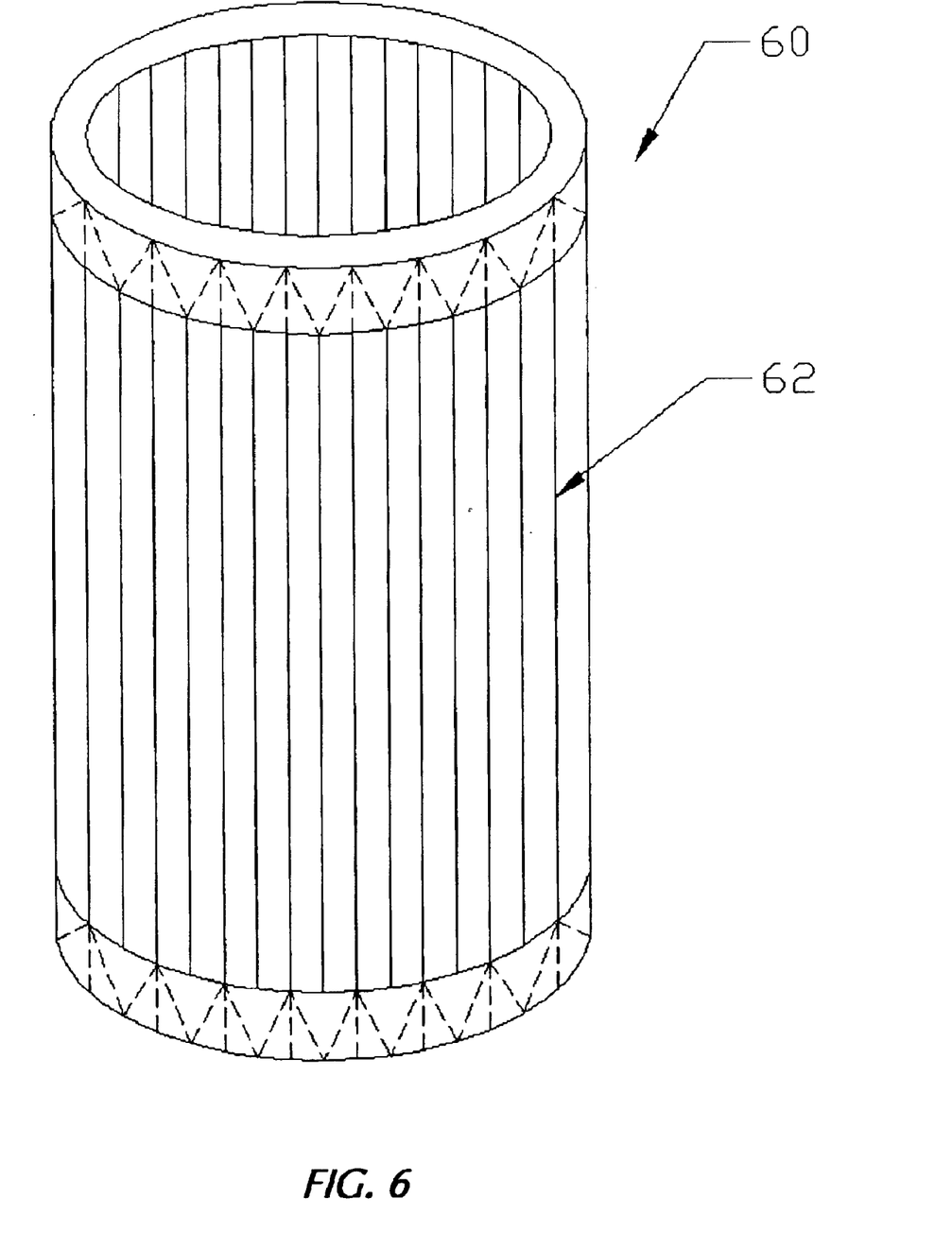
FIG. 6 is a perspective view of a collective protection filter in accordance with the invention.

In collective protection applications, the air in shelters, armored fighting vehicles or any other closed space, is recirculated internally, through the filter to adsorb any gas, even in minute amounts, that may have penetrated into the space. The filter media described above may be used for such applications. An example of a configuration for this type of filter 60 is illustrated in FIG. 6, having a pleated element 62. This is a pleated radial flow configuration, as opposed to the axial flow configuration described above.

It will be understood that in these examples, one of the substrate layers of a filter medium may in itself be a HEPA medium, which provides significant particulate and aerosol protection. Thus, a single structure may efficiently provide both HEPA and vapor filtering.

The present invention departs from prior art immobilized adsorbents that use brittle, unstable materials. In sharp contrast, the filter media of the present invention is much more stable because the fiber of the substrates absorb shock and vibration, the particles are bonded to the substrate in an extremely secure fashion. The resulting structure is not subject to brittle fracture or failure and the resulting material is rugged, flexible, shock resistant and readily pleatable. It can advantageously utilize a military grade carbon which is tightly compacted, yet has high permeability. The carbon layer is generally compacted to greater than ninety percent of the theoretical bulk density of the carbon. In particular, it is compacted to between 85% and 115% of the normal bulk density of carbon, as measured in accordance with ASTM Standard D 2854-96. This compaction achieves a very high degree of control over, and reduction of, the axial dispersion in the filter medium. Thus, a thin layer of the material provides superior absolute reduction of contamination. However, the degree of compaction is insufficient to cause an increase in pressure drop to a point where the material is no longer usable for the applications described herein.

The adsorptive particles in the filter media of the present invention are not compacted together due to the presence of fibers, or are bonded by an adhesive layer only to a substrate and not to one another, and are present in only a single layer, the present invention is directed to a compact structure having a composite layer thickness of more than one particle of adsorbent material, where this thickness does not include the substrate or substrates upon which the adsorbent layer is disposed. Further, as noted above the adsorbent carbon layer has a thickness greater than 90% of the theoretical bulk density of the carbon.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A filter system comprising:
   one or more pleated layers of a high surface area composite operating in series, each layer having an air permeability greater than about 9 m/min at about 1.27 cm water column, and comprising adsorbent or chemically reactive particles immobilized into a flexible form and containing greater than about 300 g/m$^2$ of said particles, and wherein a pressure drop of a plurality of layers is less than about 5 cm water column at a rated flow for a given air purification application.

2. The filter system of claim 1 wherein the adsorbent or chemically reactive particles of the composite comprise activated carbon.

3. The filter system of claim 2 wherein the activated carbon is packed to a density of about 85% to about 115% of a bulk density of the activated carbon.

4. The filter system of claim 2 wherein the activated carbon has an average particle size of about 20×50 mesh.

5. The filter system of claim 1 wherein the high surface area composite contains about 500 to greater than about 2000 g/m$^2$ of activated carbon.

6. The filter system of claim 1 wherein the high surface area composite further comprises a first air permeable substrate, a second air permeable substrate, and binder, wherein the adsorbent or chemically reactive particles and binder are admixed and disposed between the first air permeable substrate and the second air permeable substrate such that a portion of the adsorbent or chemically reactive particles are bound to the second air permeable substrate by a portion of the binder.

7. The filter system of claim 1 wherein the one or more pleated layers of the high surface area composite generates a pressure drop of no more than about 0.635 cm water column at a flow rate of about 57.912 m/min.

8. The filter system of claim 1 wherein the one or more pleated layers of the high surface area composite further comprises particles selected from the group consisting of activated alumina, zeolites, diatomaceous earth, silicates, aluminosilicates, titanates, bone char, calcium hydroxyapatite, manganese oxides, iron oxides, magnesia, perlite, talc, polymeric particulates, clay, iodated resins, ion exchange resins, ceramics, and combinations thereof.

9. The filter system of claim 1 wherein said one or more pleated layers of the high surface area composite are configured as a radial flow air filter material.

10. The filter system of claim 1 in combination with a collective protection system.

11. The filter system of claim 1 retrofitted into an existing building ventilation system.

12. The filter system of claim 1 further including a high efficiency particulate air filter medium.

13. A filter system comprising:
   a plurality of composite layers operating in series, each of said composite layers comprising:
      a first air permeable substrate;
      a second air permeable substrate; and
      activated carbon particles loaded at a high density at a rate of about 600 to 2000 g/m$^2$ between the first air permeable substrate and the second air permeable substrate and further including a binder wherein at least a portion of the binder binds at least a portion of the activated carbon particles to one another and at least a portion of the activated carbon particles to one or both of the first air permeable substrate and the second air permeable substrate,
   wherein a pressure drop of the plurality of composite layers is less than about 5 cm water column at a rated flow for a given air purification application.

14. The filter system of claim 13 wherein the activated carbon particles have an average particle size of about 20×50 mesh.

15. The filter system of claim 13 wherein the activated carbon particles comprise an impregnated carbon.

16. The filter system of claim 13 wherein each composite layer has a thickness of about 1.4 mm.

17. The filter system of claim 13 wherein each layer of composite layer is pleated with about three pleats per inch.

18. The filter system of claim 17 in combination with a collective protection system.

19. The filter system of claim 13 wherein said plurality of composite layers are spiral wound.

20. The filter system of claim 19 in combination with a collective protection system.

21. The filter system of claim 13 wherein said plurality of composite layers are stacked.

22. The filter system of claim 21 in combination with a collective protection system.

23. The filter system of claim 13 retrofitted into an existing building ventilation system.

24. The filter system of claim 13 further including a high efficiency particulate air filter medium.

25. A filter system comprising:
   a plurality of flexible composite layers operating in series, each layer comprising:
      a first air permeable substrate; and
      activated carbon particles having a particle size of about 20×50 mesh and binder disposed on the first air permeable substrate at a load rate of about 2000 g/m$^1$, a portion of the binder binding at least a portion of the activated carbon particles to one another and at least a portion of the activated carbon particles to the first air permeable substrate; wherein the activated carbon particles are closely packed to a high density and compacted to a critical range of compaction wherein axial dispersion is reduced and permeability is high; and
   a frame for encapsulating a periphery of each layer of said plurality of flexible composite layers, said frame being generally oval in shape and having a first radius of curvature in a first direction, and a second radius of curvature in a second direction.

26. The filter system of claim 25 wherein the second direction is perpendicular to the first direction, and the first radius of curvature and the second radius of curvature are selected so that said filter system generally follows a contour of a human adult cheek.

27. The filter of claim 25 in combination with a respirator, said respirator having a compartment for receiving said filter.

* * * * *